United States Patent [19]

Mir

[11] 4,378,567

[45] Mar. 29, 1983

[54] ELECTRONIC IMAGING APPARATUS HAVING MEANS FOR REDUCING INTER-PIXEL TRANSMISSION NONUNIFORMITY

[75] Inventor: Jose M. Mir, Rochester, N.Y.

[73] Assignee: Eastman Kodak Company, Rochester, N.Y.

[21] Appl. No.: 230,090

[22] Filed: Jan. 29, 1981

[51] Int. Cl.³ .......................... H04N 1/46; H04N 1/22
[52] U.S. Cl. ..................................... 358/75; 358/296; 358/78
[58] Field of Search ...................... 358/75, 60, 61, 213, 358/56, 78, 285, 284, 296, 300, 302; 355/4, 5, 18, 32, 37, 38, 67, 70, 71; 350/370, 374, 378, 380, 400; 353/20

[56] References Cited

U.S. PATENT DOCUMENTS

| | | | |
|---|---|---|---|
| 3,428,743 | 2/1969 | Hanlon | 358/61 |
| 3,470,310 | 9/1969 | Shashoua | 358/61 |
| 3,930,119 | 12/1975 | Schmidt | 358/285 |
| 4,129,357 | 12/1978 | Frosch | 350/403 |
| 4,229,095 | 10/1980 | Mir | 358/75 |
| 4,294,524 | 10/1981 | Stolov | 358/59 |
| 4,316,196 | 2/1982 | Jacobs | 350/356 |

Primary Examiner—Michael A. Masinick
Attorney, Agent, or Firm—John D. Husser

[57] ABSTRACT

Electronic light valve of the kind having an imaging zone, an imagewise addressable light valve array, and means for directing illumination to the imaging zone via the array, operably associated with such apparatus, for reducing inter-pixel variation in light transmitted to the imaging zone. One disclosed embodiment includes a photo-bleachable mask having pixel portions corresponding to pixels of the light valve array, which have been photo-bleached and fixed at density levels compensating for such nonuniformities. Another embodiment includes a pixel mask comprising negative working photographic emulsion which has been exposed and developed to different compensating density levels.

15 Claims, 3 Drawing Figures

ELECTRONIC IMAGING APPARATUS HAVING MEANS FOR REDUCING INTER-PIXEL TRANSMISSION NONUNIFORMITY

CROSS-REFERENCE TO RELATED APPLICATIONS

Reference is made herein to U.S. patent application Ser. No. 230,096, entitled "Electronic Color Imaging Apparatus Having Improved Color Control Device", filed Jan. 29, 1981, in the name of J. M. Mir; U.S. patent application Ser. No. 230,089, entitled "Light Valve Imaging Apparatus Having Improved Optical Configuration", filed Jan. 29, 1981, in the name of J. R. Varner; U.S. patent application Ser. No. 230,099, entitled "Light Valve Imaging Apparatus Having Improved Addressing Electrode Structure", filed Jan. 29, 1981, in the names of J. M. Mir and J. R. Varner; U.S. patent application Ser. No. 230,092, entitled "Improved Light Valve Imaging Apparatus and Method for Providing Gray Scale, filed Jan. 29, 1981 in the name of J. M. Mir; U.S. patent application Ser. No. 230,095, entitled "Light Valve Imaging with Optimized Addressing Potential(s) to Reduce Inter-Pixel Nonuniformity", filed Jan. 29, 1981, in the name of J. M. Mir; and U.S. patent application Ser. No. 873,441, entitled "Color Imaging Devices and Color Filter Arrays Using Photo-Bleachable Dyes", and filed Jan. 30, 1978 in the name of K. H. Drexhage.

BACKGROUND OF THE INVENTION

1. Field of the Invention

The present invention relates to apparatus and method for forming an image (on a recording medium or for viewing) from an electrical signal and more particularly to improvements in electronic imaging apparatus and method of the kind using an array of individually addressable light valves.

2. Brief Description of the Prior Art

My U.S. Pat. No. 4,229,095 discloses various embodiments of electronic color-imaging apparatus that utilize arrays of separately-addressable, pixel (picture element) sized, electro-optical means to effect multicolor exposure of panchromatic imaging media. One preferred kind of electro-optical means disclosed in that patent is a light valve comprising a panel of ferroelectric ceramic material, such as lanthanum doped lead zirconate titanate (PLZT) sandwiched being crossed polarizers and activated to operate in a quadratic Kerr cell mode. Thus an array of such light valves comprises a panel of PLZT material with a plurality of interleaved electrodes formed on one major surface in a manner facilitating the selective application of discrete electrical fields across (in a direction perpendicular to the direction of viewing) discrete surface areas of the plate. Upon application of such fields, the PLZT material becomes birefringent and rotates the direction of polarization of incident light by an extent dependent on the field magnitude. This results in the transmission of light through the PLZT panel and polarizers varying as a function of the electric fields. A color image is formed electronically by selectively opening and closing of such light valves in synchronization with the energization of red, green and blue exposing sources and according to the red, green and blue color information for the pixels of that image.

In certain applications, e.g. where it is desired to produce high quality continuous tone images such as photographic prints, a detractive artifact has been noted in imaging with light valve arrays that are electrically addressed by the above-described techniques. Specifically, in continuous tone areas a visible density difference is sometimes evident between adjacent pixel regions which have been exposed by light valves that received substantially identical electrical energizations. These density differences are particularly detractive when exposure is made with relative movement between the imaging media and linear light valve arrays and appear as streaks or bands.

SUMMARY OF THE INVENTION

In one significant aspect, it is a purpose of the present invention to provide means and method for reducing the distractive artifacts such as streaking and banding described above and thus improve the electronic, light-valve, imaging approach disclosed in my abovementioned patent.

Thus in general, the present invention provides, for electronic light valve imaging apparatus, means for reducing the inter-pixel variation in light transmitted to the apparatus imaging zone by the light valve array. In one preferred embodiment such means comprises a mask including a plurality of pixel portions respectively aligned with pixel portions of the array, at least some of the mask portions having different optical density to compensate for inter-pixel transmission variations of the array. One preferred embodiment of such mask means comprises a photo-bleachable dye layer than has been bleached to different optical density levels for different respective light valve pixels and fixed. Another preferred embodiment of such mask means comprises a developed, negative working, photographic emulsion.

BRIEF DESCRIPTION OF THE DRAWINGS

The subsequent description of preferred embodiments of the invention refers to the attached drawings in which:

FIG. 3 is a plan view of a portion of the light valve array of FIG. 1 showing exemplary addressing electrode structure for use in the present invention.

DETAILED DESCRIPTION OF THE PREFERRED EMBODIMENTS

Figure 1:
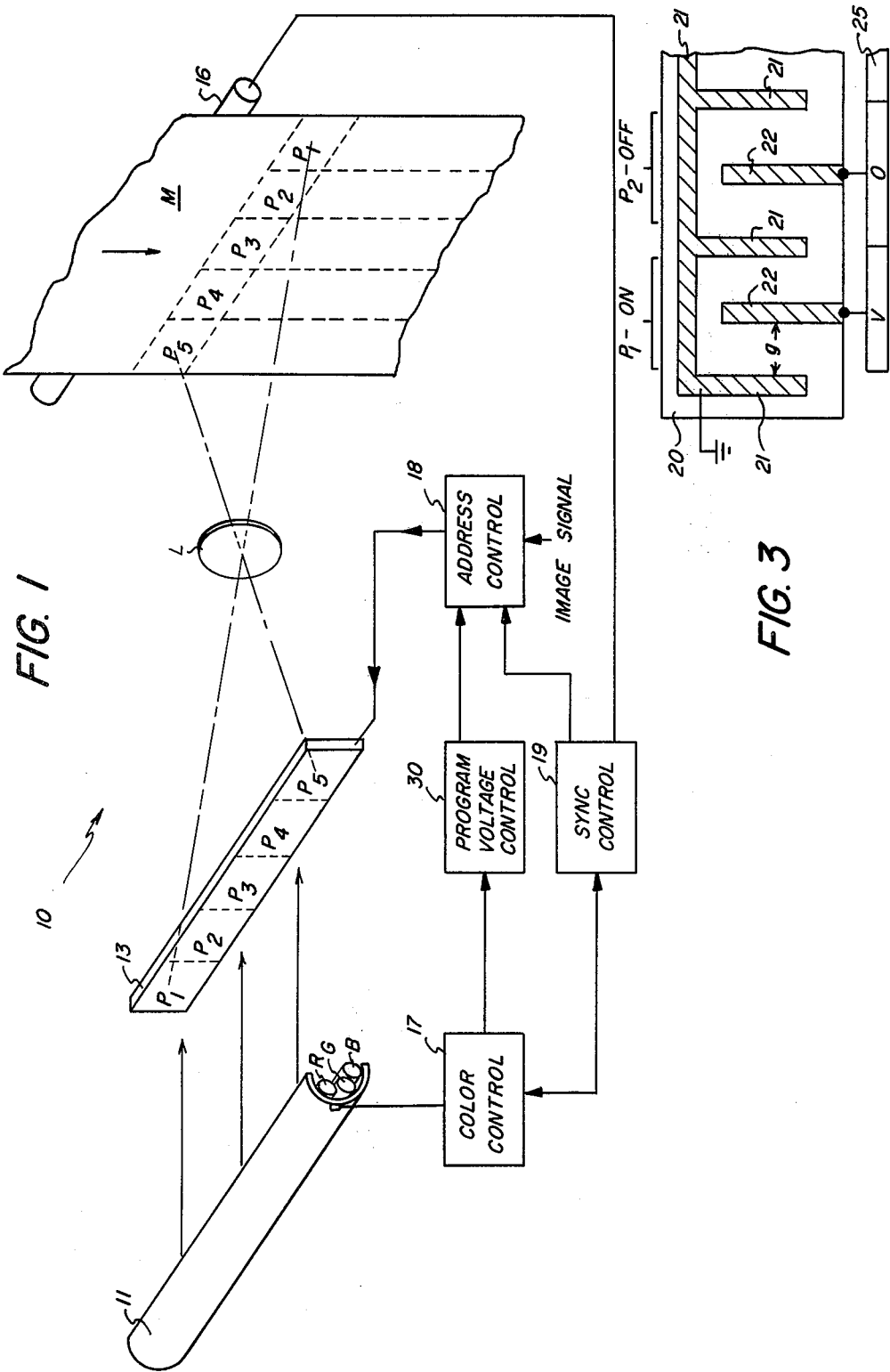
FIG. 1 is a schematic perspective view of one preferred embodiment of the present invention.
Figure 2:
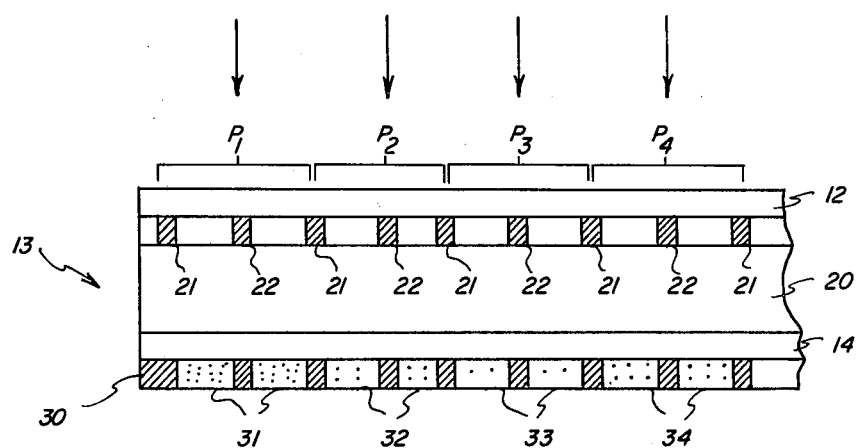
FIG. 2 is a cross-sectional view of a light valve array constructed in accordance with one embodiment of the present invention and suitable for use in the FIG. 1 apparatus.

Referring to FIGS. 1 and 2, the electronic color imaging apparatus 10 there illustrated comprises an illumination source 11 for uniformly illuminating electro-optic modulator 20 of light valve array 13 through entrance polarizer 12, with different light colors in a sequential fashion. The illumination source can include separately-energizable red (R), green (G) and blue (B) light sources as illustrated, a panchromatic source and moving multicolor filter as disclosed in my aforementioned U.S. Pat. No. 4,229,095, or an electro-optic light color control such as disclosed in U.S. patent application Ser. No. 230,096, entitled "Electronic Color Imaging Apparatus Having Improved Color Control Device", filed Jan. 29, 1981, in the name of J. M. Mir. It is highly preferred that the light from the source be collimated and substantially normal to the ingress of the light valve. One preferred approach for accomplishing this is disclosed in U.S. patent application Ser. No. 230,089, entitled "Light Valve Imaging Apparatus Having Improved Optical Configuration", filed Jan. 29, 1981, in the name of J. R. Varner and incorporated herein by reference. The electro-optic modulator 20 can be formed of a material such as disclosed in U.S. Pat. No. 4,229,095, which transforms from an isotropic, non-polar state to a birefringent polar state in response to application of an electric field. One particularly preferred material is 9/65/35 PLZT.

As shown in more detail in FIGS. 2 and 3 the modulator has reference electrodes 21 and signal electrodes 22 formed on the surface thereof in a configuration adapted to provide discrete, separately-activatable electric fields transversely across the pixel portions $P_1$–$P_5$ of the electro-optic panel 20. In the embodiment illustrated in FIG. 2, the reference electrodes 21 are commonly coupled to a source of reference potential, e.g., ground and the signal electrodes of each pixel portion are separately addressable with a potential by addressing means, e.g. serial in-parallel out shift register 25 to activate their respective pixels to an ON or OFF condition. An exemplary addressing ("V" potential applied, "O" no potential applied) is shown in FIG. 2 for the pixel ON, OFF conditions indicated. There are a variety of electrode configurations which can be utilized to create discrete, separately-activatable fields transversely across the discrete pixel portions of a panel of electro-optic material, some of which are disclosed in copending U.S. patent application Ser. No. 230,099, entitled "Light Valve Imaging Apparatus Having Improved Addressing Electrode Structure", filed Jan. 29, 1981, in the names of J. M. Mir and J. R. Varner, incorporated herein by reference.

In general, the application of an activating field across the inter-electrode gaps "g" of a pixel portion of the electro-optic material causes it to transform to a birefringent state and rotate the direction of polarization of light passing therethrough. Thus the polarized light from entrance polarizer 12 is rotated by activated pixels and is not rotated by non-activated pixels. Exit polarizer 14 is crossed relative to entrance polarizer 12 and therefore light passing activated pixel portions of the modulator 13 passes exit polarizer while light passing non-activated modulator portions does not. Lens means illustrated schematically as L images the light valve array 13 at the apparatus exposure station wherepast a recording medium M is moved by transport means 16.

The movement of recording medium by transport 16, the energization of illumination source 11 by color control 17 and the activation of addressing means 25 by address control 18 are all synchronized, e.g. by synchronization control 19 so that the $P_1$–$P_5$ pixel portions of each line of the recording medium are exposed or not to the different colors of light in accordance with the color image information of the image to be reproduced that is carried to addressing control e.g. in the form of an electrical video signal. One preferred technique for achieving continuous tone imaging is disclosed in U.S. patent application Ser. No. 230,092, entitled "Improved Light Valve Imaging Apparatus and Method for Providing Gray Scale", filed Jan. 29, 1981, in the name of J. M. Mir and incorporated herein by reference.

It will be appreciated that all multicolor information can be input during a single pass of the recording medium (in which case the illumination source would provide at three separate color pulses per line) or that the medium can make multiple passes (e.g. once for each of red, green and blue exposures). Regardless of which of these or other addressing approaches is utilized, it is highly desirable that the pixels of light valve array 13 exhibit a uniform modulating response. It has been noted, however, that in prior art apparatus complete uniformity of response is quite difficult to attain and as a result bands or streaks are sometimes visible on the recording medium as differences in density due to different exposures by differently modulating pixels of prior art arrays. This can be more fully appreciated if it is supposed that a prior art light valve array located in place of array 13 in the FIG. 1 apparatus is addressed to uniformly expose all portions of the medium M moving past the exposure station. Thus all pixels of the modulator would be addressed with the same activating voltage for each line. The result should be a completely uniform density; however, if the individual pixels exhibit nonuniform response the density of bands respectively exposed by each (indicated by dotted lines in FIG. 1) will have a different density which is detractive, particularly in continuous tone areas of an image.

The above-described inter-pixel non-uniformities are caused by various factors. Variation in the electrode spacing and modulator thickness between the individual pixels of a light valve array are causing factors which can be ameliorated satisfactorily by careful fabrication procedures. Inter-pixel crystallographic and compositional variation of the electro-optic material are causing factors of exposure non-uniformity that are more difficult to avoid. The present invention provides means for obviating inter-pixel light transmission variation. U.S. patent application Ser. No. 230,095, entitled "Light Valve Imaging with Optimized Addressing Potential(s) to Reduce Inter-Pixel Nonuniformity", filed Jan. 29, 1981, in the name of J. M. Mir, discloses other highly useful structures and modes of operation for minimizing such inter-pixel exposure variation. The present invention can be used alone, or in combination with the approach disclosed in the abovementioned application, to minimize inter-pixel exposure variation.

One structure for reducing inter-pixel transmittance variation (i.e., variation in transmittance of pixels of a light valve array which are addressed with substantially the same activating field) is shown in FIG. 2. There it can be seen that a mask 30 is associated with the light valve array 13. The mask 30 can have various structures and be formed in a variety of ways of which will be described in more detail below. However, it is a general feature of this aspect of the present invention that the mask includes pixel portions 31–34, respectively aligned with pixels $P_1$–$P_4$ of the array 13, which have predetermined optical densities that are designed to compensate for the transmittance variation between pixels $P_1$–$P_4$. That is the optical density of mask portions 31–34 will differ in a degree designed to make the light which passes to the image medium M from the various pixels of the light valve array and mask combination more equal (for equal activating fields).

One preferred construction for mask 30 comprises a layer of bleachable dye, e.g. of the kinds disclosed in U.S. patent application Ser. No. 873,441, entitled "Color Imaging Devices and Color Filter Arrays Using Photo-Bleachable Dyes", and filed Jan. 30, 1978, in the name of K. H. Drexhage. In fabricating such an embodiment of the present invention, a layer of such bleachable dye is coated on the light valve array to have an optical density at least as great as the maximum inter-pixel variation of the light valve array. A predetermined addressing voltage is then applied in succession to each pixel of the light valve array while its transmission of a high intensity light source is monitored with a photodetector. The intensity of the light source is adjusted according to a negative feedback algorithm to bleach the dye until a predetermined transmission is obtained. As described in detail in the Drexhage application, the masking dye layer is then fixed by leaching the sensitizer from the layer. In color imaging applications the dye bleach layer can comprise a combination of cyan, magneta and yellow bleachable dyes which are successively bleached to the desired transmission level by red, green and blue light sources.

Another preferred embodiment of the present invention can comprise a negative working photographic emulsion coated on the light valve array or on a transparent support coupled to the light valve array. Extremely fine grained emulsions such as KODAK 649 emulsion are preferred. A constant activating voltage is applied to all pixels of the array and the emulsion is exposed through the pixels to a uniform light source of intensity yielding high contrast for the emulsion utilized. The emulsion is then developed to form a mask having pixels whose density vary respectively in proportion to transmission of their aligned light valve pixel. It will be appreciated that for color applications a layer of cyan, magneta and yellow photosensitive emulsions an exposure to red, green and blue light sources will be used. Another approach using photographic emulsions is to first measure the pixel transmission variations with the operating voltage level and then apply the emulsion to make a pixel-by-pixel exposure in accordance with the known transmission differences and the known density versus exposure characteristics of the emulsion. This latter method yields lower residual mask densities and thus higher light transmission.

Another alternative corrective mask technique involves varying the light transmitting area of the pixel. In this approach, a portion of the light transmitting area is masked, e.g. with an opaque material and then selectively trimmed (e.g. by ablation with a laser) to adjust the mask size to equalize light transmission to the nominal transmission.

The invention has been described in detail with particular reference to certain preferred embodiments thereof, but it will be understood that variations and modifications can be effected within the spirit and scope of the invention.

What is claimed is:

1. In electronic imaging apparatus having an exposure zone for exposing a photosensitive medium and including: (1) a light valve array having a plurality of pixels each including a modulator portion that is independently activatable by an electric field from an isotropic to a birefringent state, (2) illuminating means for directing illumination toward said exposure zone via said light valve array and (3) addressing means for applying discrete electric fields to pixels of said light valve array in accordance with the optical density pattern of an image to be reproduced, the improvement comprising mask means located between said illuminating means and said exposure zone, said mask means comprising a plurality of mask pixels which are aligned respectively with pixels of said light valve array, at least some of said mask pixels differing in optical density and the optical densities of said mask pixels being of predetermined relative magnitudes to compensate for transmission variations between said light valve pixels.

2. The invention defined in claim 1 wherein said mask means includes a photo-bleachable dye layer that has been photo-bleached to different optical density levels for different respective light valve pixels and fixed.

3. The invention defined in claim 1 wherein said mask comprises a negative working photographic emulsion which has been exposed and developed to varying density levels to correct for transmission variation in the light valve array pixels.

4. The invention defined in claim 3 wherein said emulsion has been exposed through said array.

5. In electronic imaging apparatus having an exposure zone whereat a photosensitive medium can be supported for imaging and including: (1) a light valve array having a plurality of pixels each including a modulator portion that is independently activatable by an electric field from an isotropic to a birefringent state, (2) illuminating means for directing uniform illumination toward said exposure zone via said light valve array and (3) addressing means for applying discrete electric fields to pixels of said light valve array in accordance with the optical density pattern of an image to be reproduced, the improvement comprising mask means located between said illuminating means and said exposure zone for reducing the inter-pixel variation in light transmitted to said exposure zone by said light valve array.

6. In electronic imaging apparatus having an exposure zone whereat a photosensitive medium can be supported for imaging and including: (1) a light valve array having a plurality of pixels each including a modulator portion that is independently activatable by an electric field from an isotropic to a birefringent state, (2) illuminating means for directing illumination toward said exposure zone via said light valve array and (3) addressing means for applying discrete electric fields to pixels of said light valve array in accordance with the optical density pattern of an image to be reproduced, the improvement comprising means, operably associated with said apparatus, for reducing the inter-pixel variation in light transmitted to said exposure zone by said light valve array.

7. An improved light valve array for use in electronic imaging, said array comprising:
 (a) a panel of electro-optic material of the kind transformable from an isotropic to a birefringent state in response to application of an electric field;
 (b) electrode means defining a plurality of discrete, separately addressable pixel portions on said panel;
 (c) first and second crossed polarizing means sandwiching said panel; and
 (d) mask means including a plurality of pixel portions respectively aligned with pixel portions of said modulator, at least some of said mask portions having different optical density.

8. The invention defined in claim 7 wherein said mask means comprises a developed negative working photographic emulsion which has been exposed through said pixel array.

9. The invention defined in claim 7 wherein said mask means includes a photo-bleachable dye layer that has been photo-bleached to different optical density levels for different respective light valve pixels and fixed.

10. The invention defined in claim 7 wherein said mask means comprises a negative working emulsion which has been exposed and developed to varying density levels to correct for transmission variation between different pixel portions of said modulator.

11. In electronic imaging apparatus including: (1) a light valve array having a plurality of pixels each including a modulator portion that is independently activatable by an electric field from an isotropic to a birefringent state, (2) illuminating means for directing uniform illumination toward an imaging zone via said light valve array and (3) addressing means for applying discrete electric fields to respective modulator portions of said light valve array in accordance with the light transmission information of an image to be reproduced, the improvement comprising mask means located between said illuminating means and said imaging zone, said mask means comprising a plurality of mask pixels, respectively aligned with pixels of said light valve array, at least some of said mask pixels differing in optical density, the optical densities of said mask pixels being of predetermined relative magnitudes to compensate for transmission variations between said light valve pixels.

12. The invention defined in claim 11 wherein said mask means comprises a developed negative working photographic emulsion.

13. The invention defined in claim 11 wherein said mask means includes a photo-bleachable dye layer that has been photo-bleached to different optical density levels for different respective light valve pixels and fixed.

14. In electronic imaging apparatus having an imaging zone including: (1) a light valve array having a plurality of pixels each including a modulator portion that is independently activatable by an electric field from an isotropic to a birefringent state, (2) illuminating means for directing illumination toward said imaging zone via said light valve array and (3) addressing means for applying discrete electric fields to pixels of said light valve array in accordance with the light transmission information of an image to be reproduced, the improvement comprising mask means located between said illuminating means and said imaging zone for reducing the inter-pixel variation in light transmitted to said imaging zone by said light valve array.

15. In electronic imaging apparatus having an imaging zone and including: (1) a light valve array having a plurality of pixels each including a modulator portion that is independently activatable by an electric field from an isotropic to a birefringent state, (2) illuminating means for directing illuminating toward said imaging zone via said light valve array and (3) addressing means for applying discrete electric fields to pixels of said light valve array in accordance with the light transmission information of an image to be reproduced, the improvement comprising means, operably associated with said apparatus, for reducing the inter-pixel variation in light transmitted to said imaging zone by said light valve array.

* * * * *